US008418279B2

(12) United States Patent
Coenraets (10) Patent No.: US 8,418,279 B2
(45) Date of Patent: Apr. 16, 2013

(54) SURFACE COVERING DEVICE (75) Inventor: Benoît Coenraets, Wauthier-Braine (BE)

(73) Assignee: BecoFlex S.A., Wauthier-Braine (BE)

( * ) Notice: Subject to any disclaimer, the term of this patent is extended or adjusted under 35 U.S.C. 154(b) by 274 days.

(21) Appl. No.: 13/055,751

(22) PCT Filed: Jul. 23, 2009

(86) PCT No.: PCT/EP2009/059504
§ 371 (c)(1),
(2), (4) Date: Jan. 25, 2011

(87) PCT Pub. No.: WO2010/010152
PCT Pub. Date: Jan. 28, 2010

(65) Prior Publication Data
US 2011/0119823 A1    May 26, 2011

(30) Foreign Application Priority Data

Jul. 25, 2008   (BE) .................................. 2008/0417

(51) Int. Cl.
*E04H 4/00*   (2006.01)
(52) U.S. Cl.
USPC ................. 4/502; 4/503; 160/273.1

(58) Field of Classification Search ............. 4/498, 500, 4/502, 503; 160/273.1
See application file for complete search history.

(56) References Cited

U.S. PATENT DOCUMENTS

| 5,950,253 A | 9/1999 | Last |
| 6,026,522 A * | 2/2000 | Last ................................. 4/502 |
| 2001/0023506 A1 * | 9/2001 | Mathis et al. .................... 4/502 |

FOREIGN PATENT DOCUMENTS

| DE | 1 038 731 | 9/1958 |
| FR | 2 789 425 A1 | 8/2000 |
| FR | 2 803 769 A1 | 7/2001 |

* cited by examiner

*Primary Examiner* — Tuan N Nguyen
(74) *Attorney, Agent, or Firm* — Laurence A. Greenberg; Werner H. Stemer; Ralph E. Locher (57) ABSTRACT

The invention relates to a device for covering a surface such as a swimming pool, a sports field, a glazed surface, a vehicle body, including: (a) a drum rotatingly mounted and capable of winding or unwinding a cover, said drum being mounted on longitudinal translation mechanisms including rails provided on either side of said surface; (b) an attachment system for said cover at one transverse end of the surface to be covered so that the translation and the rotation of the drum results in the winding/unwinding of the cover above the surface to be covered; (c) a system for continuously locking the longitudinal edges of the cover onto said rails that is progressively fitted during the unwinding operation.

15 Claims, 5 Drawing Sheets

SURFACE COVERING DEVICE

FIELD OF THE INVENTION

The invention relates to a surface covering device that is easy to use and best satisfies the requirements of the application concerned.

TECHNOLOGICAL BACKGROUND

Covers are applied to surfaces for reasons that depend on the nature of these surfaces.

Therefore, in the case of a pool such as a swimming pool, the cover can prevent pollution by leaves or animals, can save energy, water and reagents and can or should ensure the security of persons, in particular of children. In a basin for the desalination or other treatments of a fluid, a cover makes it possible to prevent dilution of liquid due to rain or excessive evaporation due to heat.

When it involves a sports field such as an outdoor clay or grass tennis court, a cover makes it possible to protect it against adverse weather conditions and in particular intermittent rain.

Moreover, a vehicle body is covered notably to ensure its stability in a suction loading caused by the movement of the vehicle and to protect it against adverse weather conditions.

Covers are also used as blinds for greenhouses, winter gardens or vehicle windows in order to prevent any overheating on the inside, and as sun protection for patio awnings.

In all situations, users usually search for an economical covering device allowing covering and uncovering that is easy, secure, reproducible and rapid and requiring a minimum of human intervention.

A first totally basic device used in the case of a swimming pool comprises an inflatable or uninflatable cover that is unwound, extended and attached manually to the edges of the swimming pool. This type of device is illustrated for example in documents U.S. Pat. No. 6,691,334, GB 2 379 163 and FR 2 652 373. It is clear that here, because of the handling and storage, only fairly small-sized swimming pools are involved.

For surfaces with larger dimensions it is possible to make use of covering devices also having a drum attached to one of the transverse ends of the surface to be protected. The cover is deployed manually by pulling, by unwinding from the drum, in order to cover the surface. The weight and the dimensions of the cover require the intervention of several people so that it is properly installed. The cover is removed by winding it up around the drum by rotation: the cover is then removed from the surface by sliding over the latter. The rotation of the drum to remove the cover is carried out manually or by means of an electric motor having sufficient power to pull the completely-deployed cover. It should be emphasized that an easy deployment of the cover, in particular in the case of a swimming pool, contributes to its safety because a laborious manipulation would hamper its use.

In the present application, "longitudinal", "transverse" and their derivatives refer respectively to the direction of movement of the drum and to the direction of the axis of revolution of the latter.

In order to remove human intervention, (completely) automatic devices have been proposed; the cover is wound up around a motorized drum allowing its retraction, the drum being attached to one of the transverse ends of the surface to be protected. The cover is deployed by pulling it via its visible end with automatic pulling means of the rack or chain type or pulling cable with or without idler pulley, the cover if necessary being able to be guided by runners placed on the longitudinal ends of the surface to be covered; the cover then slides over the surface while covering it. Similarly, when the cover is retracted, the latter slides over the surface to be covered while being wound up round the drum. This automatic covering device is illustrated notably in the following documents: U.S. Pat. No. 3,574,979, GB 2 199 741, US 2005/0097834, CA 2,115,113, US 2001/0023506, U.S. Pat. No. 5,930,848, U.S. Pat. No. 4,001,900 and on site www.aquatop.be.

The two types of covering devices with drum mentioned above have the major drawback of sliding the cover which is dragged over the surface to be protected during its deployment and its retraction which causes premature wear and extra work due to the friction thus generated.

In order to alleviate this drawback, a new type of covering device with drum has been developed, the motorized drum now being mounted on a longitudinal translation mechanism. The latter moves the drum above the surface to be covered which makes it possible literally to "place" the cover on the surface during its deployment by unwinding it simultaneously from the drum during its longitudinal movement, and then raising it during its retraction, by winding it simultaneously onto the drum. The cover does not therefore slide over the surface during its deployment or during its retraction. The covering device also comprises a system for attaching the cover at one transverse end of the surface to be covered so that the translation and the rotation of the drum cause the cover to be unwound or wound up above the surface to be covered.

Examples of automatic devices of this type are disclosed for example in the following documents: WO 2005/026473, FR 2 900 951, DE 2 257 231, FR 2 893 651, FR 2 789 425, FR 2 743 502, EP 1 719 858, and on the site www.kimbay.fr. Moreover, a completely manual variant of the drum mounted in longitudinal translation is illustrated in documents WO 2007/036625 and U.S. Pat. No. 4,195,370.

The covering devices with movable drum illustrated above provide only one attachment of a transverse edge of the cover at a transverse end of the surface to be covered, the opposite edge remaining secured to the drum. No attachment system for the longitudinal edges of the cover is provided. In particular, in the case of a swimming pool, people being engaged on the cover would not be retained by its longitudinal edges and could therefore be thrown into the water. Moreover, the lack of seal of the cover on its longitudinal edges may promote small animals such as mice or snakes getting into the swimming pool.

Another automatic device with movable drum is disclosed in document FR 2 803 769. The latter provides, in contrast, a system for attaching the longitudinal edges of the cover consisting of sections of grilles rising and then folding over section by section on said longitudinal edges of the cover while holding these edges inside a gutter progressively as the cover is unwound. In this design, the longitudinal edges of the cover are pinched without being locked, which provides less security in particular in the case of swimming pools.

In the field of vehicle body covers, the longitudinal edges of the covering sheets must be securely attached to the perimeter of the latter so as not to open when the vehicle travels at high speed.

Similarly, an awning—notably an outdoor awning—of a greenhouse or a winter garden, or a cover for a desalination basin must withstand gusts of wind that are sometimes considerable.

The need therefore remains for an automatable surface-covering system that reduces friction and makes it possible to firmly attach the cover to the surface over a large portion of its perimeter.

SUMMARY OF THE INVENTION

A first object of the invention is to provide a surface-covering device that is easy to use and allows the edges of the cover to be attached to the surface to be covered over a large portion of its perimeter so as to obtain, in particular in the case of a swimming pool, greater security and greater stability and a better seal of the cover.

The invention is as defined in the main claim and comprises notably a device for covering a surface comprising:
(a) a rotatably-mounted drum capable of winding up or unwinding a cover, said drum being mounted on a longitudinal-translation mechanism comprising rails each consisting of a section piece having an outward opening on one of its faces and placed on either side of said surface;
(b) a system for attaching said cover to one transverse end of the surface so that the translation and the rotation of the drum cause the cover to unwind/wind up above the surface to be covered;
(c) a system for the continuous locking of the longitudinal edges of the cover in said rails, being engaged progressively as it is unwound,
characterized in that, in said continuous locking system:
(i) at least one of said rails comprises flanges partially closing said opening on either side;
(ii) said covering comprises at least one section piece protruding from the plane defined by the latter and extending along at least one of its longitudinal edges, at a certain distance from said edge thus forming a lip;
(iii) engagement means are provided making it possible to engage said section piece in the opening formed by the flanges of the rail so that the cover is locked to the rail when it unwinds.

The advantage of the invention is that the covering device can be automated, and makes it possible, during the unwinding of the cover, to simultaneously lay it down (therefore without making it slide) and attach it firmly and continuously over a large portion of its perimeter.

2. According to a preferred embodiment, the covering device is suitable for covering a multitude of surfaces such as for example, a pool that is filled or not filled with liquid, such as a swimming pool, a basin for the retention, the treatment or the desalination of water; a sports field, such as a tennis court or a cricket field; a vehicle body, such as a truck or a truck trailer; a glazed surface such as a greenhouse, a winter garden or a vehicle window (train, bus etc.).

One advantage of this embodiment is that the covering device can be used in multiple outdoor applications because of its good capability of keeping the cover in place if the latter is greatly stressed for example by adverse weather conditions, suction or any other overload.

According to another advantageous embodiment, the covering device comprises means for applying a transverse tensional stress to the cover when it is unwound, said stress being maintained during the locking of the cover into said rails. One advantage of this embodiment in the case of a swimming pool is that the cover placed under tension has, in its deployed state, a slight deflection making it possible to maintain a safe distance between the water surface and the center of the cover. This safe distance allows bathers trapped under the cover to breathe freely. This distance also creates a cushion of insulating air making it possible, in particular in the case of a translucent or transparent cover, to create a greenhouse effect capable of heating the swimming pool water. It is possible to obtain a deflection of the order of 6 to 8 cm over a width of 6 m between the two transverse edges of a swimming pool by the application of a transverse tension.

In addition, a taut cover has a more attractive appearance, makes it easier to drain away the water accumulated on the surface and therefore makes it possible to keep the surface clean for longer. Finally, the tension by placing the cover in a substantially horizontal plane makes it easier for people to gain access to the cover and eases maintenance work on the latter (sweeping, pressure cleaning etc.), because the ability of the cover to withstand a weight, for example of a person, is thereby increased.

Advantageously, the covering device according to the invention comprises means for applying a longitudinal tensional stress to the cover when it is unwound. The advantages are similar to those associated with the transverse tension. They are enhanced if these two tensions are combined.

The mechanism for longitudinal translation of the covering device advantageously comprises, mounted on said rails, a rack system or a pulling cable or a chain; the latter are advantageously attached to the drum by means of a translation carriage.

Although the longitudinal translation mechanism may be actuated manually, it comprises, according to another embodiment, at least one motor in order to automate the system at least partially, which is particularly advantageous in the case of a cover of relatively large size. With respect to swimming pools for example, safety depends thereon because difficult handling operations would quickly dissuade the users from deploying the cover every time it is required.

According to another embodiment, the covering device of the invention comprises, for each rail, a system comprising a rail closure strip which is inserted into the rail and thus closes off its opening progressively as the cover is wound up onto the drum. The purpose of this strip is to prevent, for example in the case of an uncovered swimming pool, a bather from being injured in contact with the rails. Moreover, the closure of the rails by the said strip when the swimming pool is uncovered keeps the rails clean.

Moreover, the cover of the device according to the invention may comprise openings forming hatches that can be closed off, for example by a flap. This flap can be secured to the cover by means of zip fasteners that can be actuated on one side or both sides of the cover, or by means of self-gripping strips. This measure may for example serve as a safety exit for bathers trapped under the deployed cover.

BRIEF DESCRIPTION OF THE FIGURES

These aspects and other aspects of the invention will be clarified in the detailed description of particular embodiments of the invention, reference being made to the drawings of the figures, in which.

DETAILED DESCRIPTION OF PARTICULAR EMBODIMENTS

Figure 1:
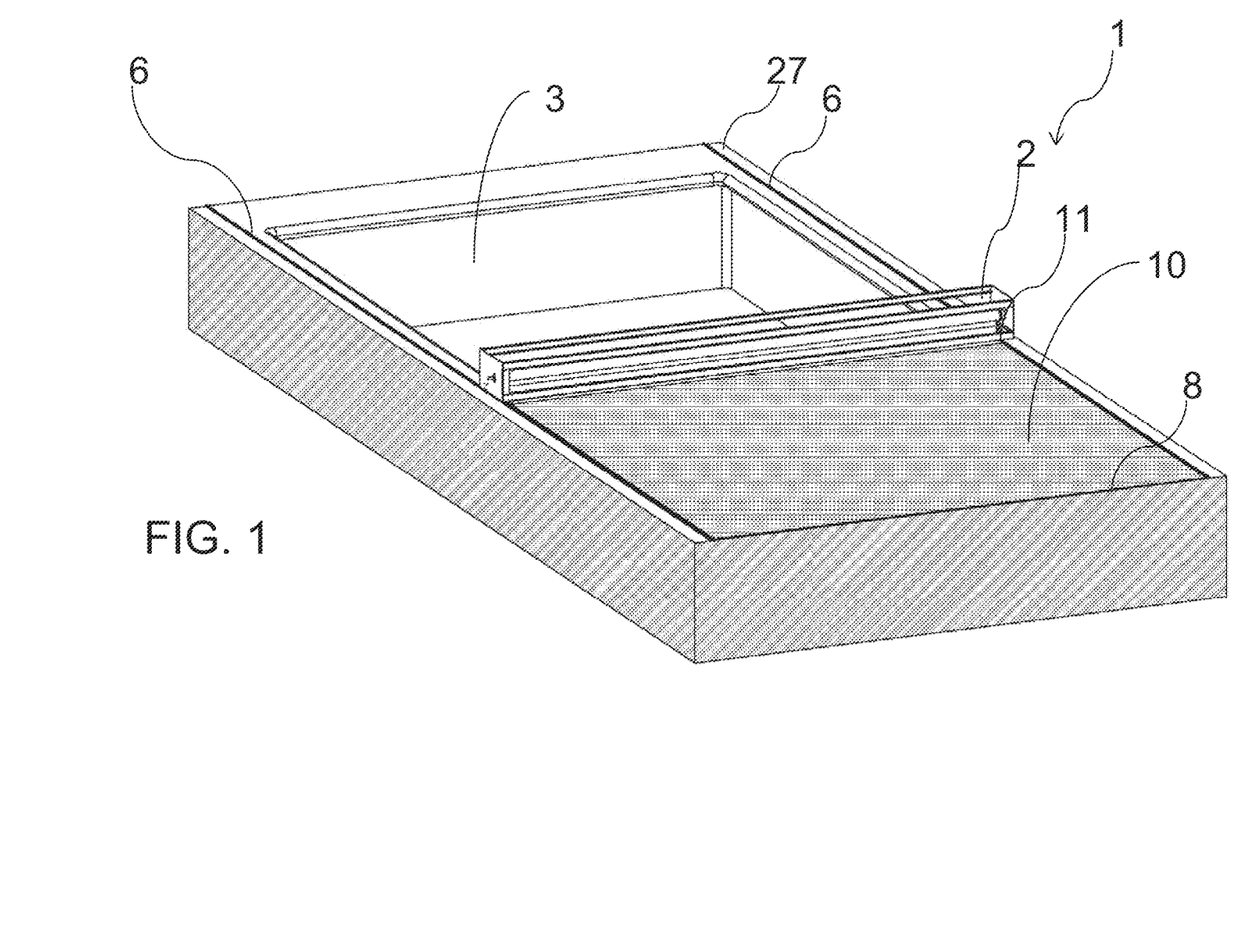
FIG. 1 is an overview in perspective of a surface with a drum in motion.

As shown in FIG. 1, the automatic device (1) for covering a surface (3) according to the invention comprises a cover (10) designed to protect said surface (3). The device (1) makes it possible to cover notably surfaces defined by the contour of a pool of water such as a swimming pool, a water-treatment basin, a wastewater purification station, a retention basin, a desalination station, etc. However, the invention can be used in any field requiring the covering of a surface, such as for example a clay or grass tennis court, a vehicle body, a glazed surface of a greenhouse, of a window of a vehicle such as a train or bus, or of a winter garden, etc. In general, in the present application, "surface" therefore means any zone delimited by a perimeter.

The device (1) comprises a drum (2) which has a length at least equal to the width of the cover (10), the latter having to have sufficient width and length to cover the whole surface to be protected (3) when it is deployed. The drum (2) is mounted on a mechanism of longitudinal translation comprising rails (6) placed on either side of said surface (3). The drum (2) has two directions of rotation: the first direction of rotation allowing it to unwind the cover (10) in order to deploy it and cover the surface to be protected (3), and the second direction of rotation allowing it to wind up the cover (10) in order to remove it and provide access to said surface (3).

The device (1) also comprises a fastening system (8) situated at one transverse end of the surface to be covered and allowing the cover to be unwound/wound up above the surface to be covered (3) during the translation and the rotation of the drum (2). Any type of known fastening system satisfying the stress and safety criteria according to the application may be used for this purpose. For example, the fastening system (8) may comprise a plurality of straps secured to the visible transverse end of the cover (10), said straps being for example furnished with anchoring hooks which are attached to the transverse portion of the contour delimiting the surface to be covered (3). Alternatively, it is possible to furnish the end to be attached of the cover with eyelets which are attached to the transverse edge of the surface by means of a series of eyebolts, of screws, of a cable or any other means. These anchoring means keep the visible transverse end of the cover (10) immobilized which makes it possible to generate a longitudinal stress on the latter and to unwind it if necessary without a motor when the drum (2) moves to cover the surface (3).

The cover may be made of any material suitable for the application in question: synthetic or natural textile materials, polymeric films, battens made of polymer, metal or wood, etc. It may be transparent, opaque or translucent and may form a barrier to fluids or conversely be porous, and may even include meshes as in a net.

A longitudinal tension may be applied to the cover during its deployment simply by ensuring that the speed of unwinding the cover by the rotation of the drum is slower than the speed of longitudinal translation of the drum, or by means of a brake or of a spring in the system for rotating the drum, or by a motorized control differentiated from the rotation and translation movements of the drum. If these two speeds are synchronous, the cover will be deployed without other tensions than those generated by its own weight in the case of covering a surface comprising a cavity such as a swimming pool.

The cover may also be furnished with drainage means allowing any fluid deposited on its surface to be carried away thus making handling easier.

Figure 2:
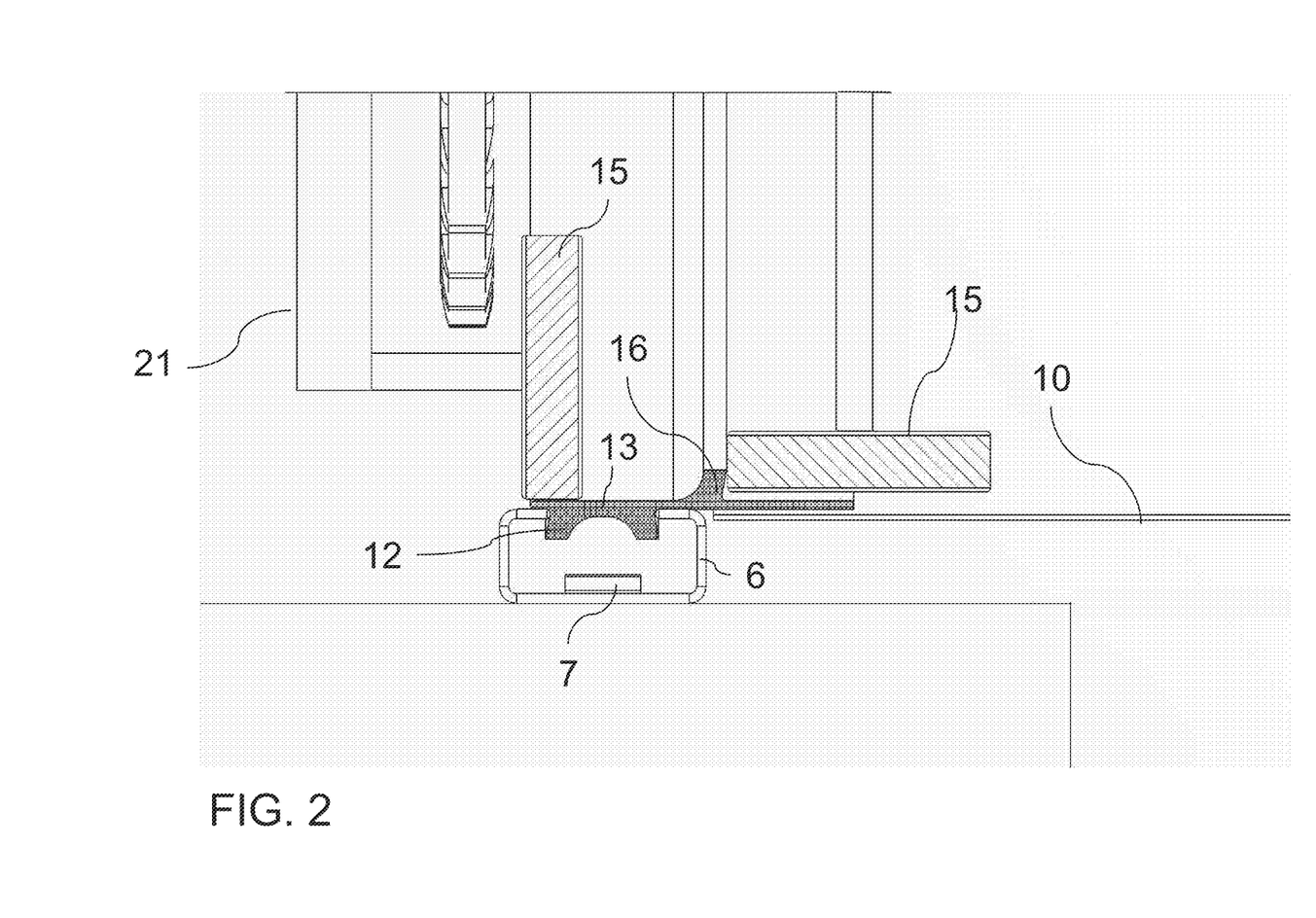
FIG. 2 is a cross section of a preferred variant of the locking system of the invention.
Figure 3:
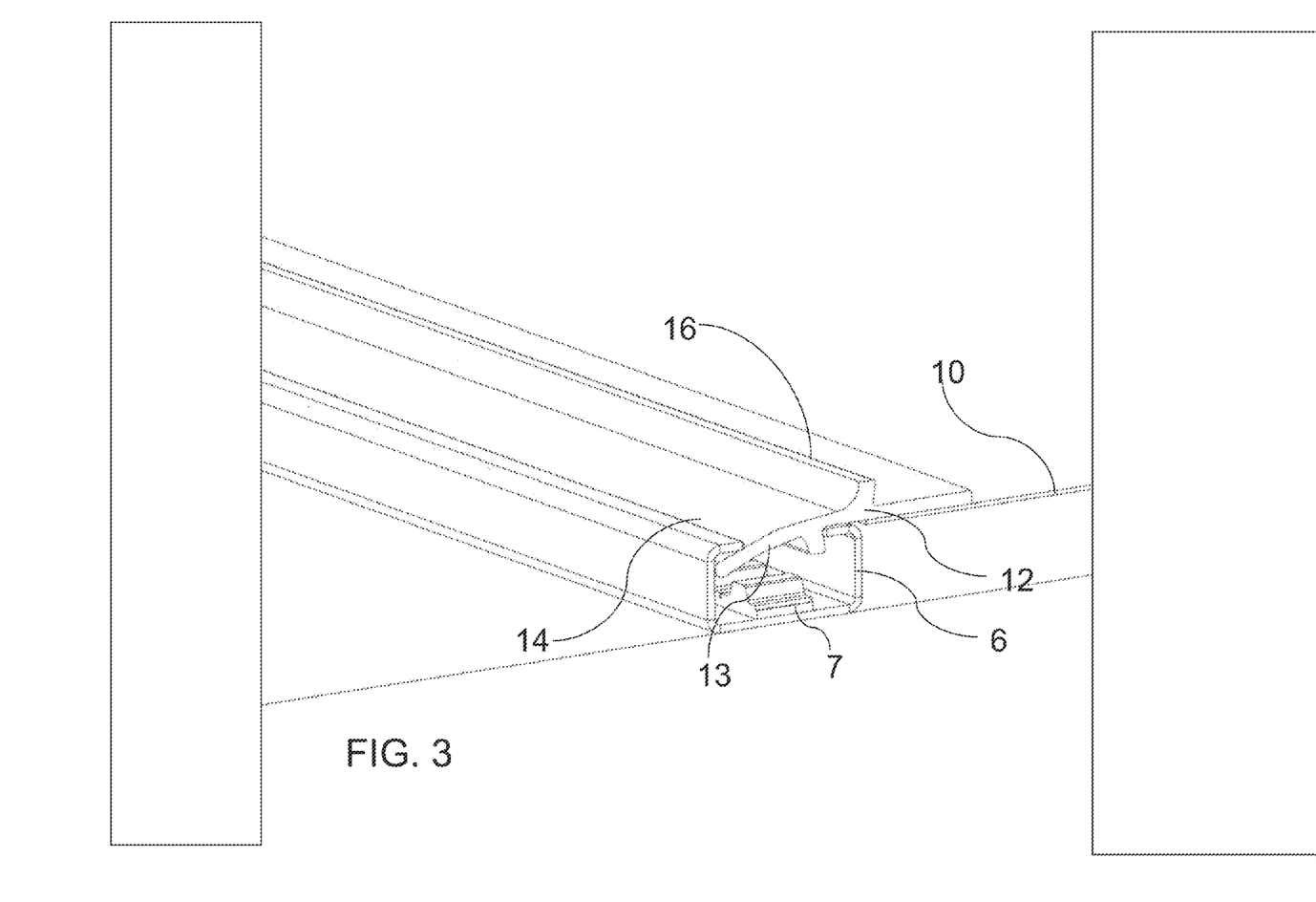
FIG. 3 is a view in perspective of another preferred variant according to the invention.

The device (1) that is the subject of the invention is noteworthy in that it comprises a system (11) for the continuous locking of the longitudinal edges of the cover (10) in the rails (6) engaging progressively as it unwinds and disengaging progressively as it winds up again. A reversible locking system according to the invention is shown as an example in FIGS. 2 and 3 and comprises:

(a) at least one rail (6) consisting of a section piece having an opening (14) toward the outside on one of its faces and comprising flanges partially closing said opening (14) on either side;
(b) a cover (10) comprising at least one section piece (12) preferably substantially with the shape of an "I", "L" or "T" protruding from the plane defined by the cover (10) and extending along at least one of its longitudinal edges, at a certain distance from said edge thus forming a lip (13);
(c) engagement means (15) making it possible to engage said section piece (12) in the opening formed by the flanges of the rail (6) and to slide the free lip (13) of the cover under one of the flanges so that the cover (10) is locked to the rail (6).

This locking system makes it possible to slide the section piece (12) and the free end of the lip (13) into the opening (14) of the rail (6) and thus to trap and therefore attach continuously in said rail (6) the corresponding longitudinal edge of the cover (10) and, by the latter, to keep the cover (10) above the surface to be covered (3) even in the case of very high mechanical stresses due for example to a suction or gravitation. In the case of swimming pools, it provides safety in the event of (authorized or unauthorized) access to the cover. Depending on the materials used, the strength of the locking system is preferably situated in the range 5 to 10 kN/m (500 to 1000 kg/m).

In the locking system (11) of the covering device (1) according to the invention, the means (15) making it possible to engage said section piece (12) in the rail (6) preferably comprise at least one winder or a guide pushing the lip (13) under a flange of the rail (6). These means make it possible to reduce the friction on the edges of the cover and therefore to exploit the device of the invention in a more economical manner through less wear of the lip (13) and through less absorbed energy.

In the locking system (11) of the covering device (1) according to the invention, the engagement means (15) advantageously comprise at least one winder or one tensioning guide applying a tensioning stress to the cover (10) transversely to the direction of the rail (6) during the locking operation. This variant allows the application of a transverse tension on the cover (10) for the purpose of reducing the deflection. Said winder rests preferably on a contact bead (16) extending along at least one of the longitudinal edges comprising said lip (13) which is engaged in the rail (s) (6).

In the locking system (11) of the covering device (1) according to the invention, the longitudinal translation mechanism advantageously comprises a rack (7) allowing the meshing of a drive gear wheel (9) mounted securely with said engagement means (15) and allowing them to be translated along at least one rail. The rack and the associated drive gear wheel thus ensure a translational movement without sliding. Advantageously, the device according to the invention (1) comprises a rack (7) placed on either side of the surface to be covered (3), which promotes the synchronization of the movement of the longitudinal translation mechanism. The rack (7) may be placed either at the bottom of the rail (6) in order, for example, to limit the bulk of the covering device, or outside the rail (6) as is usual. In a particularly advantageous manner, the rack (7) may have the shape of a flexible belt covering a considerable portion of the perimeter of the gear wheel (9) in order to ensure a particularly secure meshing with respect to sliding. If the cover (10) is mounted on a drum (2), the winders or contact beads and the gear wheel mentioned above are mounted integrally with the drum, preferably via a translation carriage (21).

The covering device of the invention advantageously comprises, parallel to the continuous locking system (11), a discrete security system. The latter, which can be seen in FIG. 4, comprises for example eyebolts (17) placed on either side of the surface to be covered (3) between each of its longitudinal edges (27) and the corresponding rails (6) of the continuous locking system (11). The eyebolts (17) are inserted into corresponding eyelets (18) placed along the longitudinal edges of the cover (3) progressively as it unwinds. This combination of eyebolts (17) and eyelets (18) provides extreme security in holding the cover (10) in the event of at least one lip (13) totally accidentally coming out of its rail (6).

Figure 4:
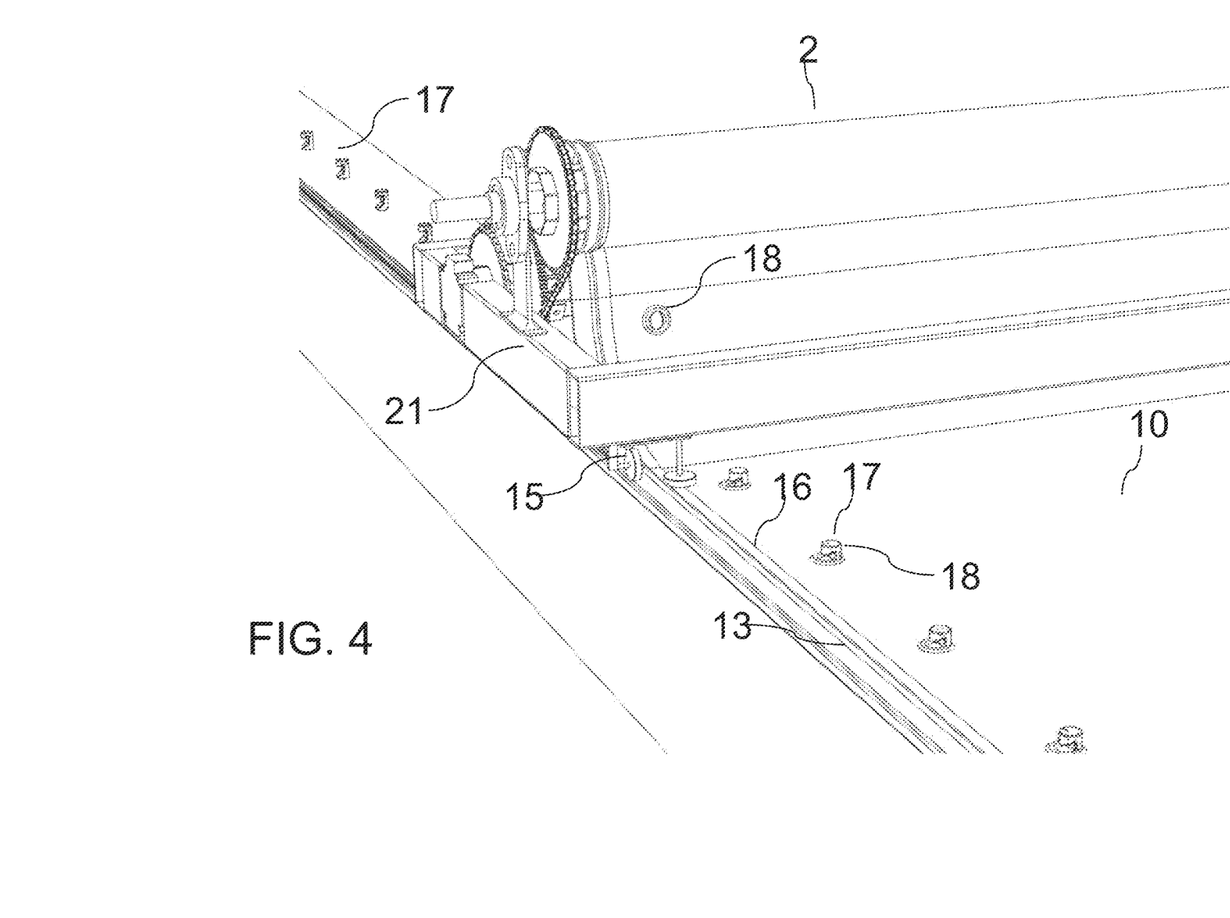
FIG. 4 is a view in perspective of another embodiment of the device of the invention also comprising safety eyelets and eyebolts.

In the covering device according to the invention, the eyebolts (17) are advantageously furnished with a coupling head the shape of which makes it possible to retain the corresponding eyelets (18) such as a harpoon or a Samson post.

Figure 5:
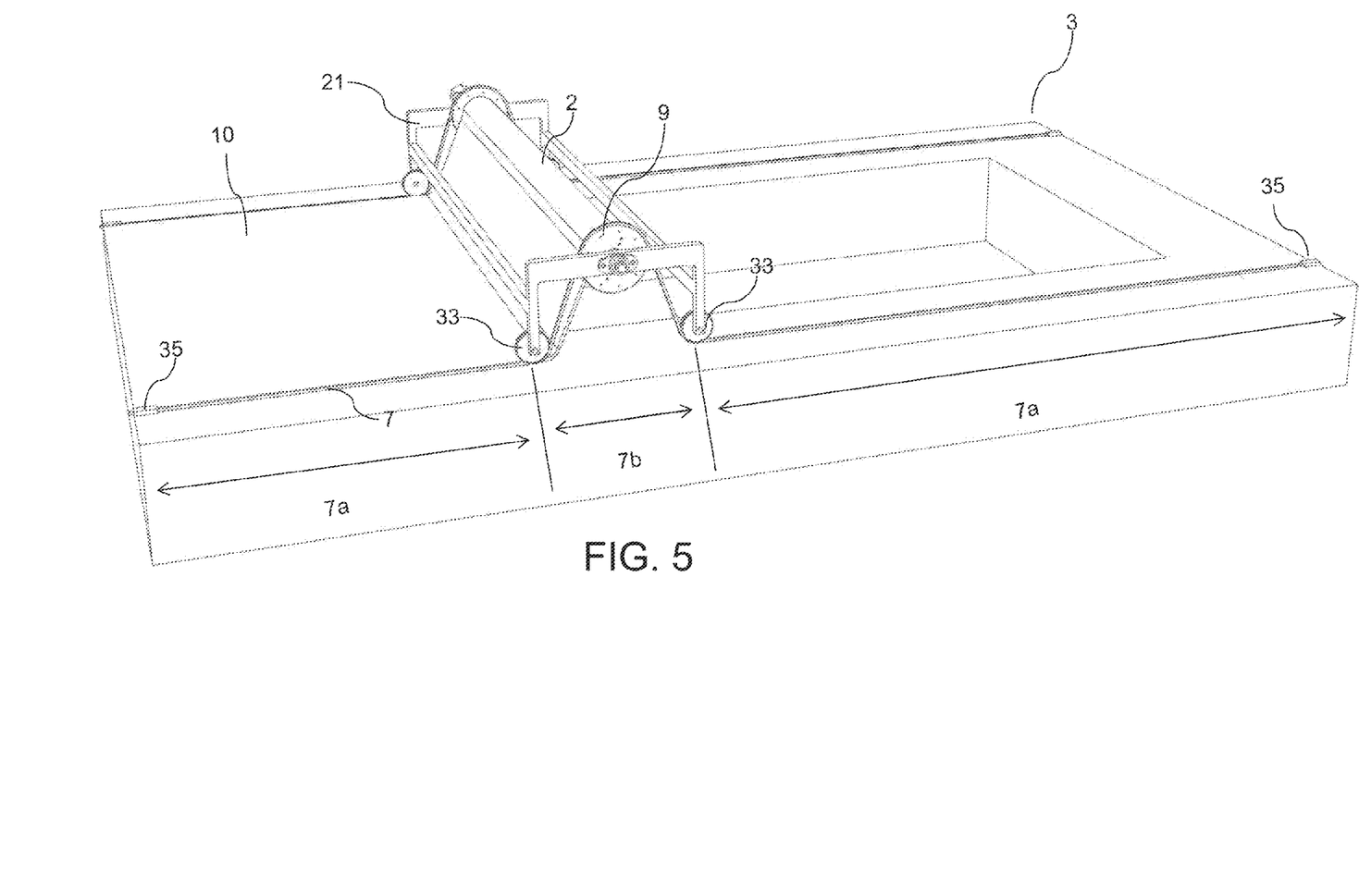
FIG. 5 is a view in perspective of an additional embodiment of the device according to the invention comprising two flexible belts being used as racks allowing the translation of the drum.

FIG. 5 shows a preferred embodiment of the invention in which said translation carriage (21) comprises:
(a) two flexible belts forming racks (7) attached only at each of their ends (35) to the four corners of the surface (3) to be covered and placed along the two peripheral lengths of the surface (3) to be covered; and to each of its ends:
(b) the drive gear wheel (9) the rotation axis of which is parallel with that of said drum (2);
(c) at least two winders (33) resting on the surface directly adjacent to the surface (3) to be covered and allowing the longitudinal translation of the carriage (21), and being mounted on either side of the drive gear wheel (9), and forming with the latter a triangle of which it forms the apex, so that the sections (7a) of each flexible belt (7) comprised between their attachment points (35) and the winders (33) are pressed onto the length of the periphery of the surface to be covered and that the section (7b) of each belt comprised between the at least two winders (33) covers the drive gear wheel (9) without sliding. The advantage of this embodiment is that the flexible belts form racks (7) allowing the movement of the carriage (21) by means of its drive gear wheels (9) by covering the latter and clamping them at a sufficiently large angle to ensure a particularly secure engagement, that is to say without sliding of the belt (7) on the periphery of the drive gear wheel (9), which helps to keep the drum (2) in its predefined trajectory. The rail or rails (6) are not shown purely for purposes of clarity.

The invention claimed is:
1. A device for covering a surface comprising:
(a) a rotatably-mounted drum capable of winding up or unwinding a cover, said drum being mounted on a longitudinal-translation mechanism comprising rails each consisting of a section piece having an outward opening on one of its faces and placed on either side of said surface;
(b) a system for attaching said cover to one transverse end of the surface so that the translation and the rotation of the drum cause the cover to unwind/wind up above the surface to be covered;
(c) a system for the continuous locking of the longitudinal edges of the cover in the opening of said rails engaging progressively as it unwinds and disengaging progressively as it winds up again,
characterized in that, in said continuous locking system:
(i) at least one of said rails comprises flanges partially closing said opening on either side;
(ii) said covering comprises at least one section piece protruding from the plane defined by the latter and extending along at least one of its longitudinal edges, at a certain distance from said edge thus forming a lip;
(iii) engagement means are provided making it possible to engage said section piece in the opening formed by the flanges of the rail so that the cover is locked to the rail when it unwinds.

2. The device as claimed in claim 1, wherein the surface to be covered is selected from a pool that is filled or not filled with a liquid, such as a swimming pool, a basin for the retention, the treatment or the desalination of water;
a sports field, such as a tennis court or a cricket field; a vehicle body, a glazed surface such as a greenhouse, a winter garden or a vehicle window.

3. The covering device as claimed in claim 1, wherein said engagement means of the continuous locking system comprise means for applying a transverse tensional stress to the cover when it is unwound, said stress being maintained during the locking of the cover into at least one of said rails.

4. The covering device as claimed in claim 1, comprising means for applying a longitudinal tensional stress to the cover when it is unwound.

5. The covering device as claimed in claim 1, wherein the longitudinal translation mechanism comprises a rack system.

6. The covering device as claimed in claim 1, wherein said longitudinal translation mechanism comprises a carriage mounted on at least one of said rails.

7. The covering device as claimed in claim 1, wherein the longitudinal translation mechanism also comprises at least one motor.

8. The covering device as claimed in claim 1, characterized in that it comprises a discrete locking system parallel to the continuous locking system and making it possible to attach the longitudinal edges of the cover to the surface to be covered in case the continuous locking system should come loose.

9. The covering device as claimed in claim 1, characterized in that it comprises, for each rail, a system comprising a strip which is inserted into the rail and thus closes off its opening progressively as the cover winds up onto the drum.

10. The covering device as claimed in claim 1, wherein the engagement means also make it possible to slide the free lip off the cover under one of the flanges of the corresponding rail.

11. The covering device as claimed in claim 1, wherein the means making it possible to engage said section piece in the rail comprise at least one winder or one guide pushing the lip under a flange of the rail.

12. The covering device as claimed in claim 3, wherein the engagement means comprise at least one winder or one tensioning guide applying a tensioning stress to the cover transversely to the direction of the rail during the locking operation.

13. The covering device as claimed in claim 12, wherein the cover comprises a contact bead extending along at least one of its longitudinal edges comprising said lip which is engaged in the rail(s) and on which contact bead said winder or tensioning guide can press.

14. The covering device as claimed in claim 5, wherein a rack is placed in each rail, thus allowing the meshing of a drive gear wheel mounted securely with said engagement means and allowing them to be translated along each rail.

15. The covering device as claimed in claim 6, characterized in that said carriage comprises:
(a) two flexible belts forming racks attached only at each of their ends to the four corners of the surface to be covered and placed along the two peripheral lengths of the surface to be covered; and to each of its ends:

(b) the drive gear wheel the rotation axis of which is parallel with that of said drum;
(c) at least two winders resting on the surface directly adjacent to the surface to be covered and allowing the longitudinal translation of the carriage, and being mounted on either side of the drive gear wheel, and forming with the latter a triangle of which it forms the apex, so that the sections of each flexible belt comprised between their attachment points and the winders are pressed onto the length of the periphery of the surface to be covered and that the section of each belt comprised between the at least two winders covers the drive gear wheel without sliding.

* * * * *